INVENTOR
Robert J. Stava
Walter G. Reininger

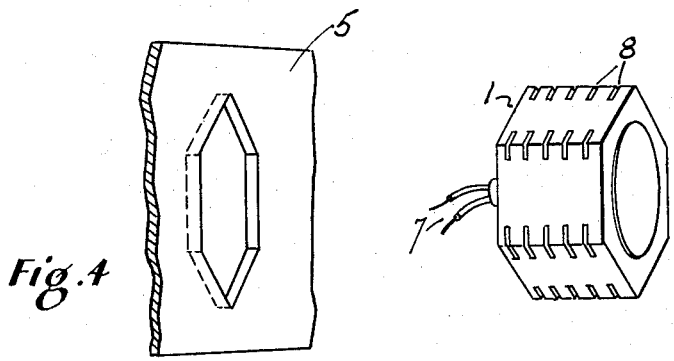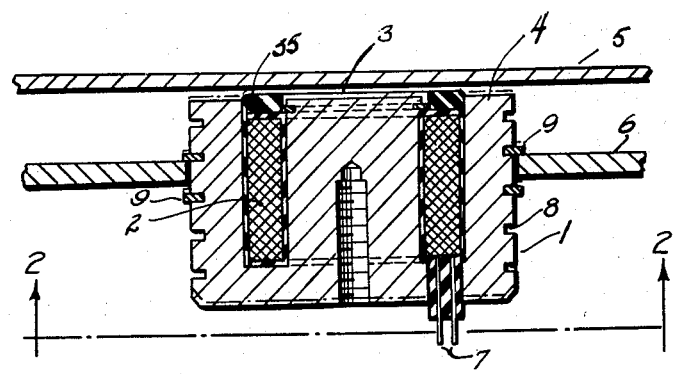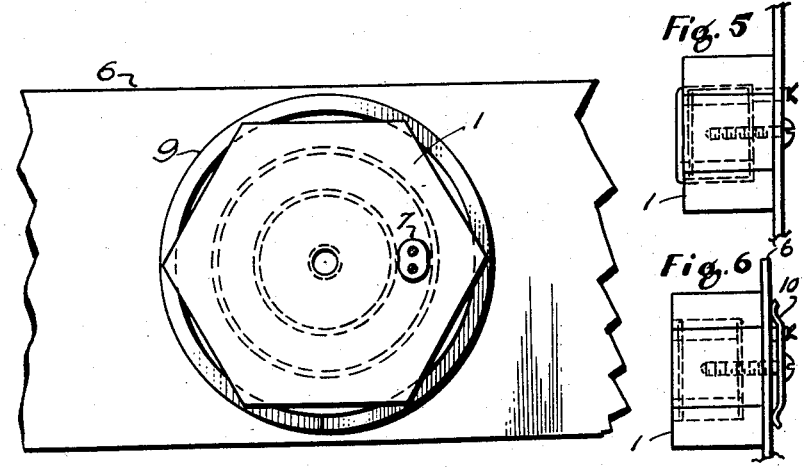

Sept. 29, 1959 R. J. STAVA ET AL 2,906,880
X-RAY APPARATUS AND CONTROL
Original Filed Jan. 9, 1951 9 Sheets-Sheet 3
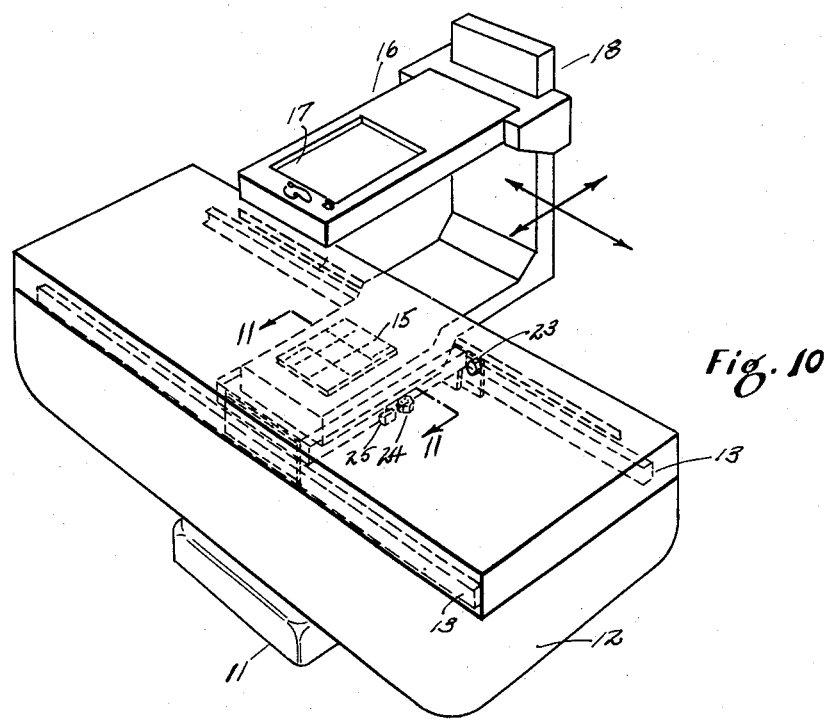
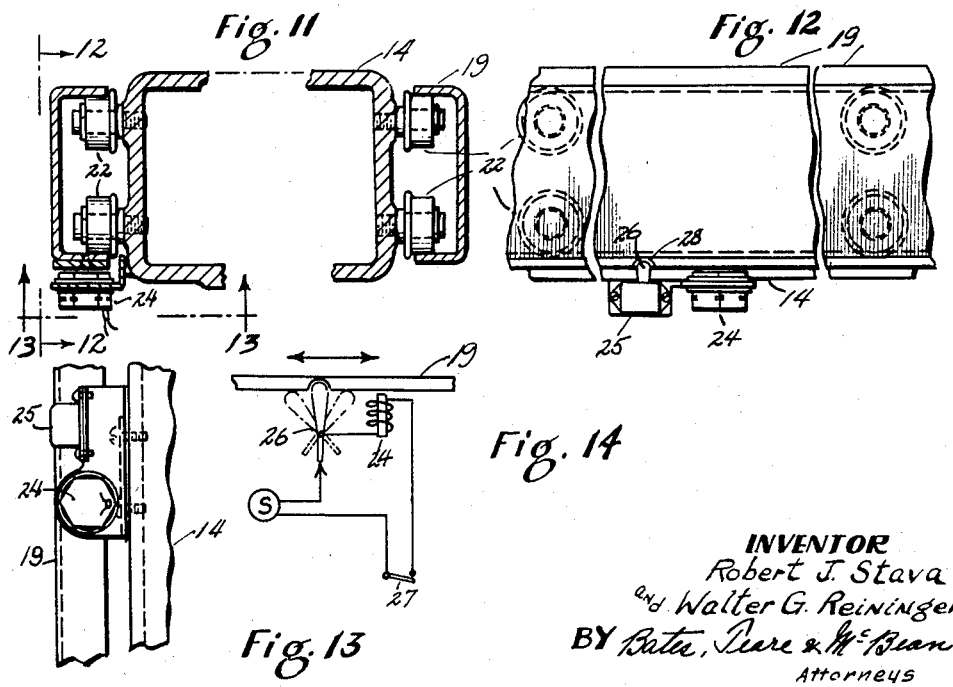
INVENTOR
Robert J. Stava
and Walter G. Reininger
BY Bates, Teare & McBean
Attorneys

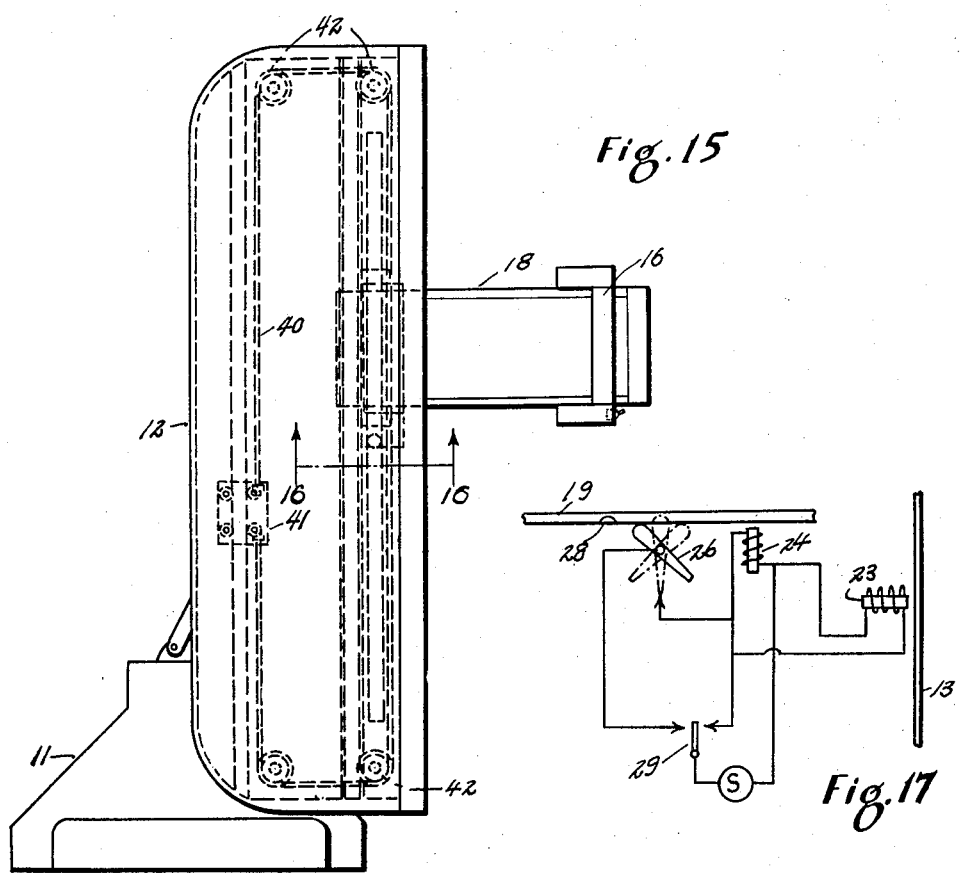
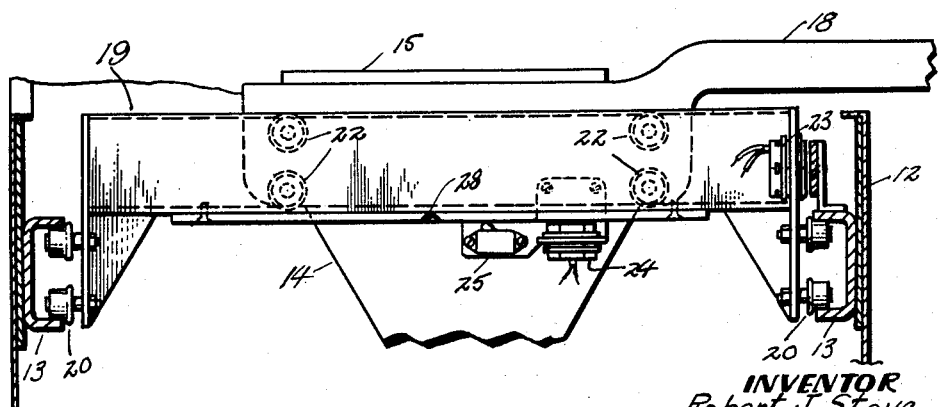

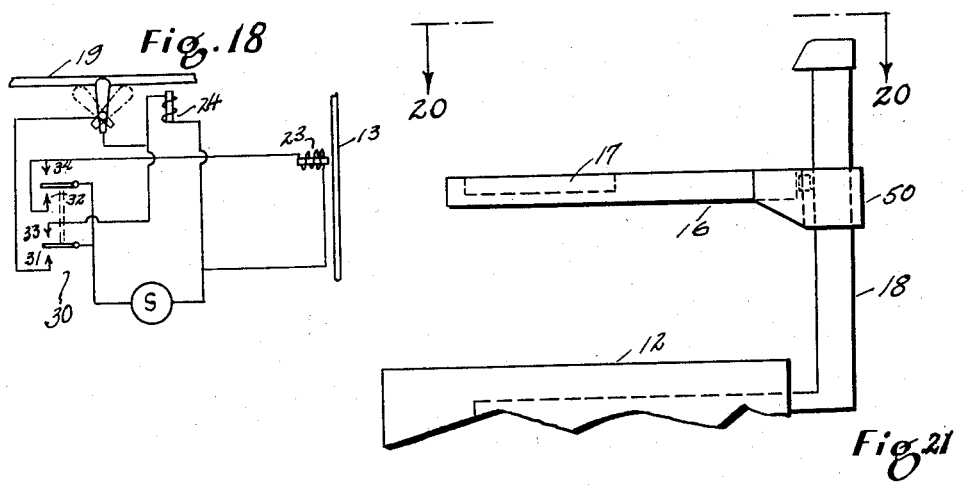
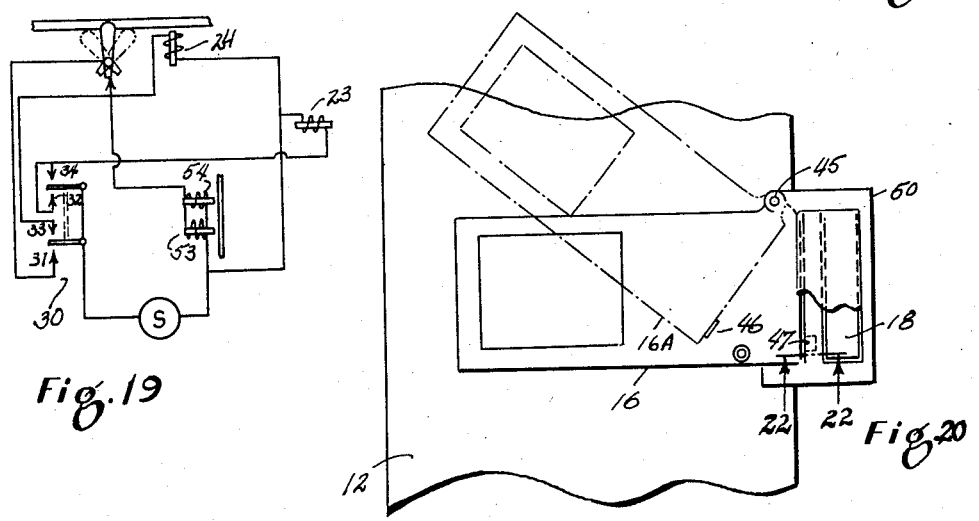
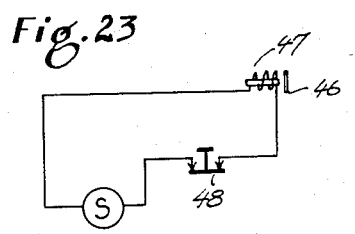
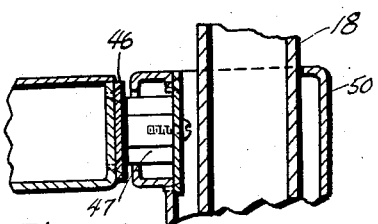

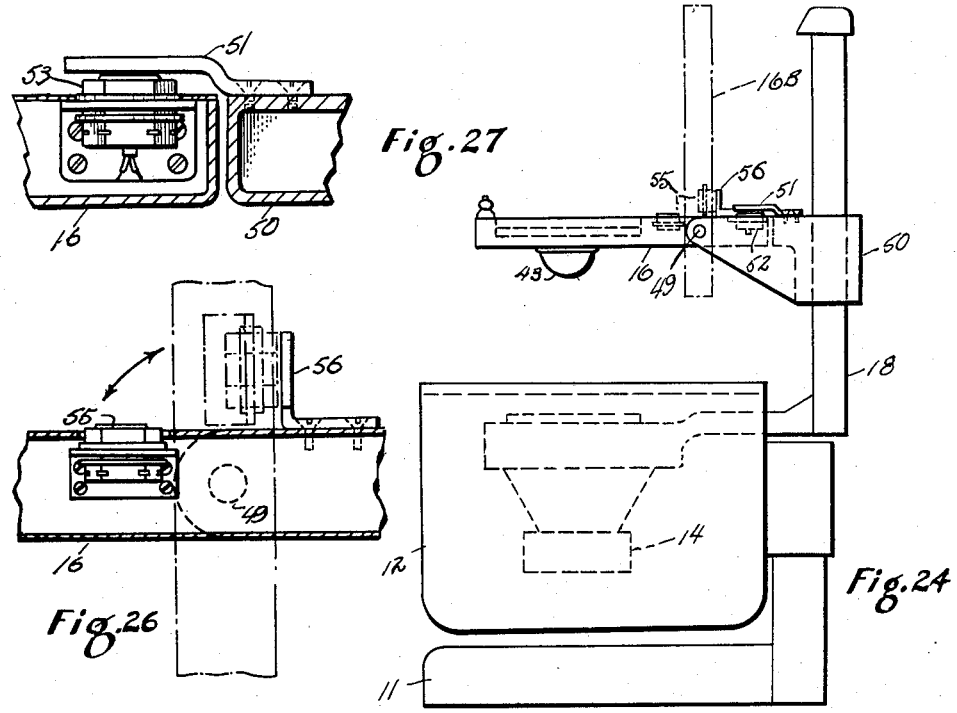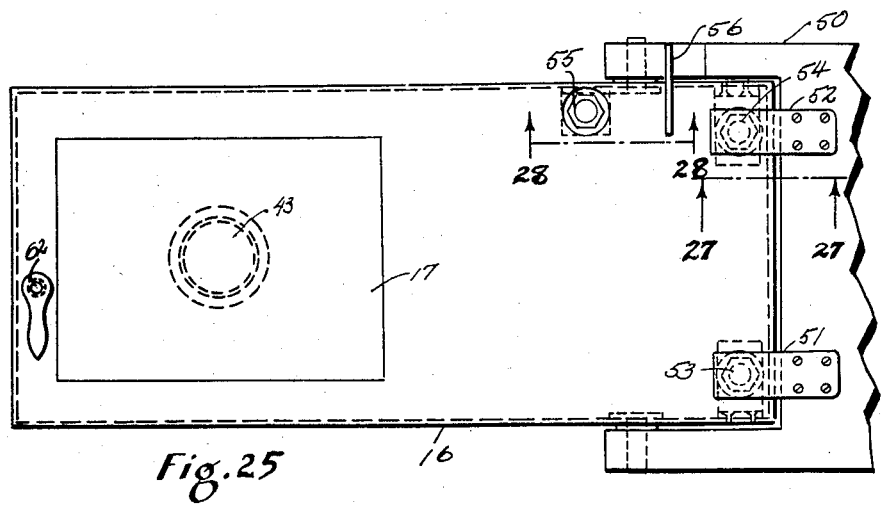

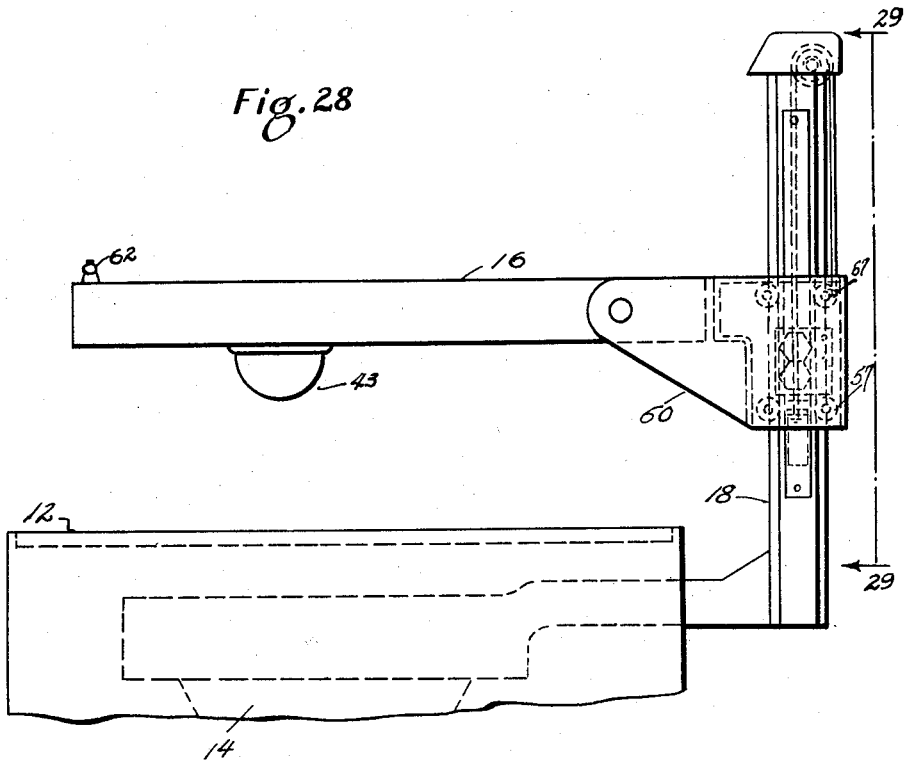
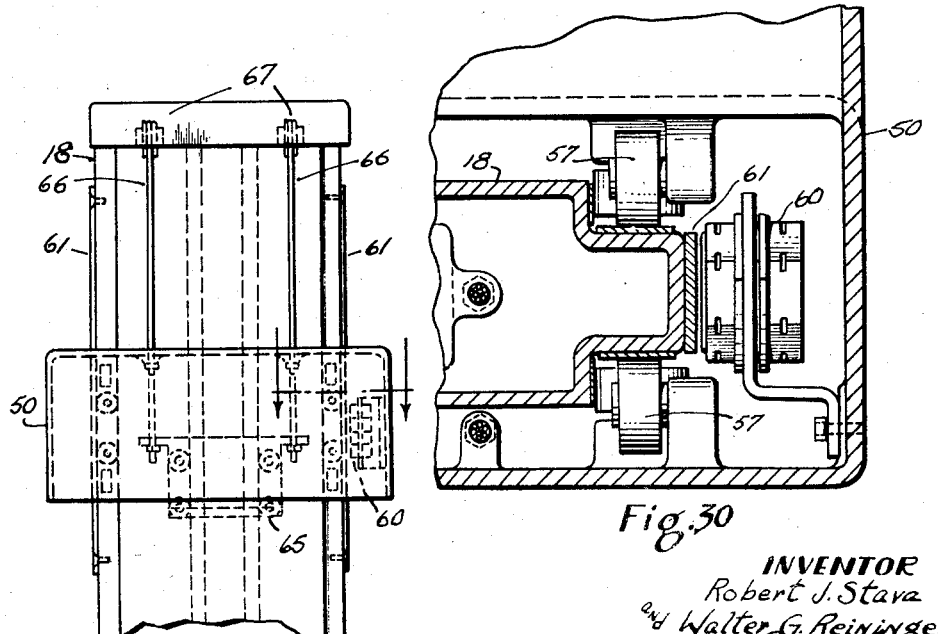

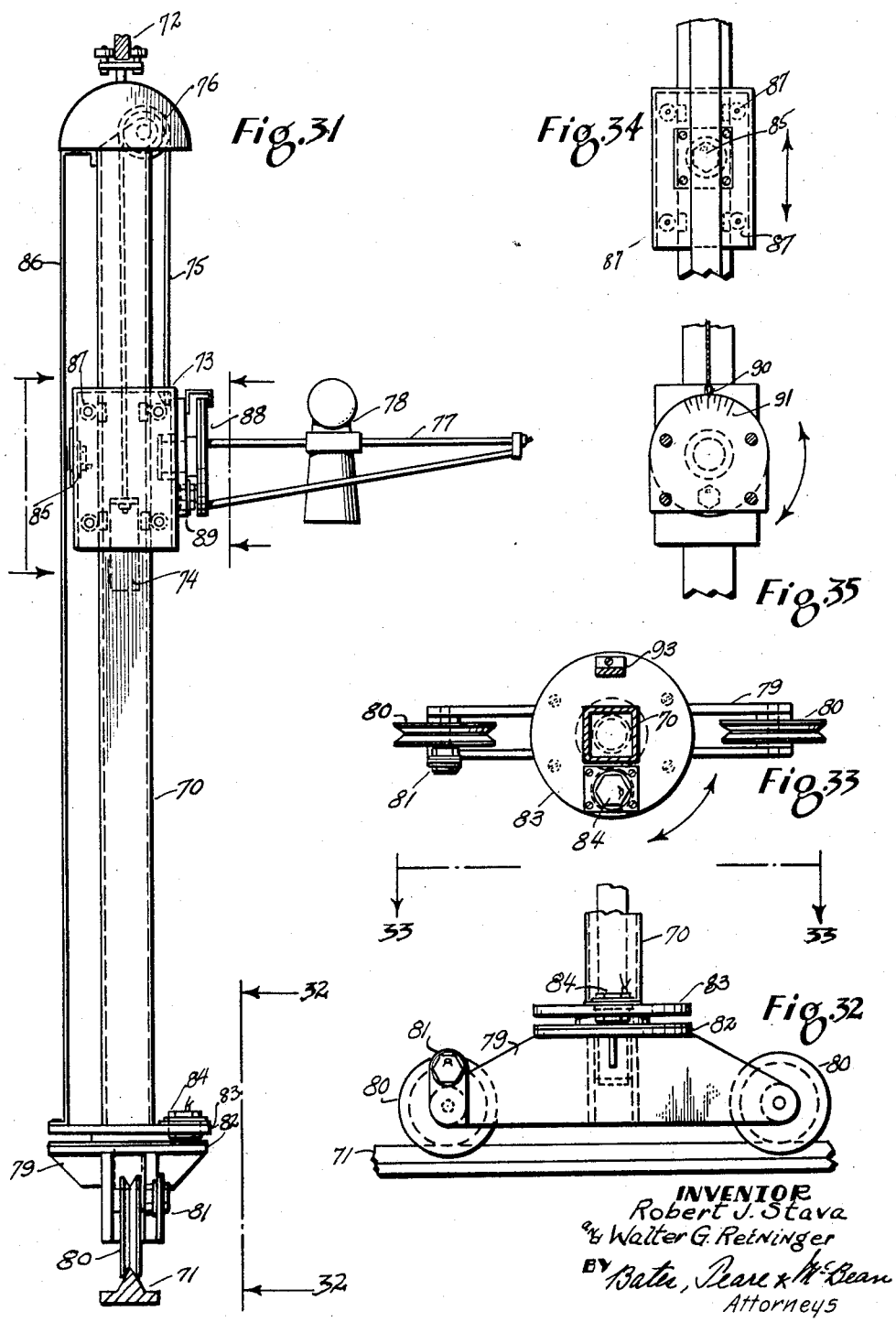

Sept. 29, 1959     R. J. STAVA ET AL     2,906,880
X-RAY APPARATUS AND CONTROL
Original Filed Jan. 9, 1951     9 Sheets-Sheet 9
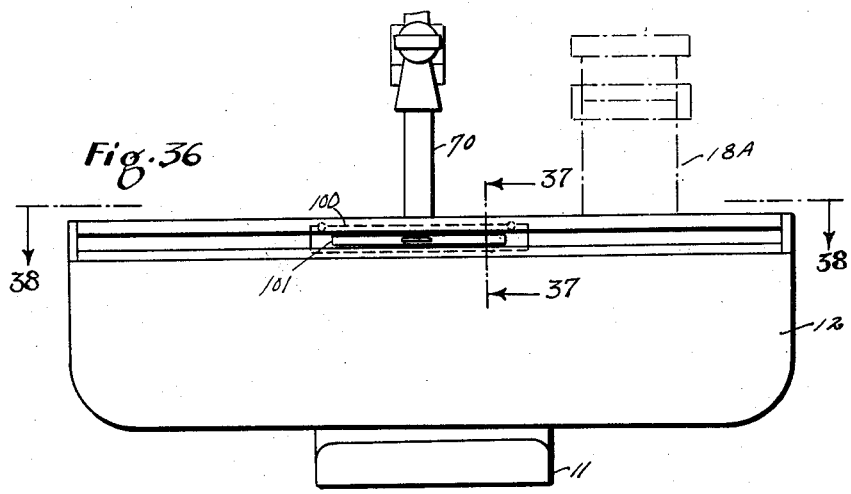
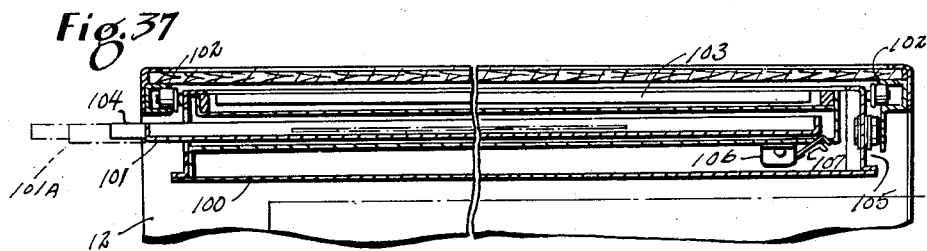
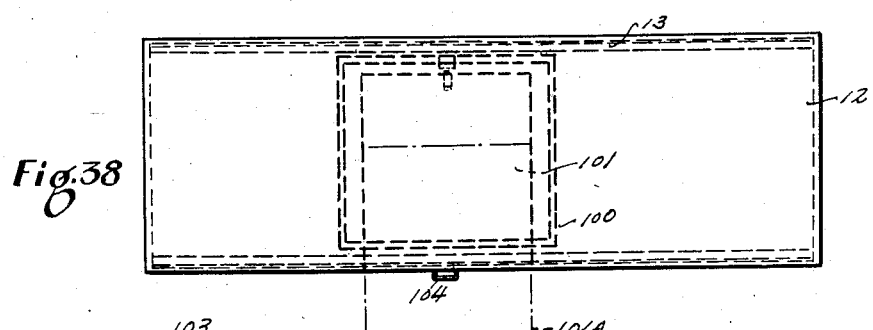
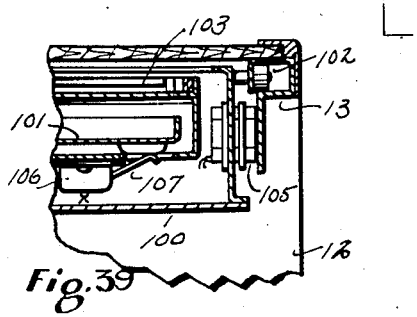
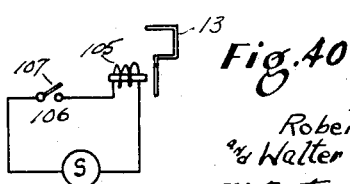
INVENTOR
Robert J Stava
% Walter G. Reininger
BY Bates, Teare & McBean
Attorneys

United States Patent Office 2,906,880
Patented Sept. 29, 1959

2,906,880

X-RAY APPARATUS AND CONTROL

Robert J. Stava, University Heights, and Walter G. Reininger, Cleveland, Ohio, assignors to Picker X-Ray Corporation, Cleveland, Ohio, a corporation of Ohio Original application January 9, 1951, Serial No. 205,088, now Patent No. 2,823,315, dated February 11, 1958. Divided and this application October 9, 1957, Serial No. 692,956

19 Claims. (Cl. 250—58)

This invention relates to X-ray apparatus and more particularly to a manner and means of controlling and arresting the inherent movement of relatively movable members of the apparatus. The present application is a division of our co-pending application, Serial No. 205,088, filed January 9, 1951, now U.S. Patent No. 2,823,315, granted February 11, 1958, entitled X-Ray Apparatus and Control.

X-ray apparatus may be employed for various diagnostic and treatment purposes, and the manner of employment involves various techniques depending upon the type of examination or treatment, such as radiography or fluoroscopy. Accordingly, this type of apparatus must usually be constructed so that the various operable members of the apparatus can be moved to a plurality of positions individually or in combination in accordance with the technique employed. Operation of an apparatus of this type which requires many relative movements also inherently requires means for arresting such movements. This is particularly true in the operation of X-ray apparatus where many of the final settings of movable members, such as the X-ray tube or fluoroscopic screen, require accuracy and prohibition against misalignment.

Heretofore, various types of mechanical locks in the form of screw or toggle mechanisms have been utilized for this purpose in X-ray apparatus. Such mechanical locks, however, are widely separated and require periodic adjustment and alignment, thus making operation of the apparatus inconvenient and burdensome for the operator.

Accordingly, it is an object of this invention to provide a magnetic type lock for X-ray apparatus which may be conveniently located for operation and which requires a minimum of adjustment and maintenance.

Another object of this invention is to provide an electro-magnetic lock for X-ray type apparatus having a plurality of movable elements and, which lock is self-adjusting and subject to remote control.

A further object of this invention is to provide an X-ray type apparatus having a plurality of relatively movable members and having a magnetic type lock for arresting each of the members individually, or in combination.

Briefly, in accordance with this invention an electro-magnetic type lock is provided which embodies a magnetic core surrounded by an energizing coil adapted to be carried by a supporting member and having a flexible member adjacent one face of the core which frictionally engages another member of the apparatus upon energization of the magnet coil whereupon the magnet is attracted to the other member in locking relation. Various combinations of the electro-magnetic type locks are distributed in operative relation throughout the X-ray apparatus in association with the various relatively movable members and have individual or combined energizing circuits including controlling switches, whereupon certain members of the apparatus may be arrested in movement individually or together with certain other movable elements in predetermined relation.

These and other objects and advantages of the invention will be further understood from the following description when considered in connection with the accompanying drawings and as pointed out in the appended claims.

In the drawings,

Fig. 1 is a section of an electro-magnetic lock shown in relation to a cooperating track;

Fig. 2 is a view of the electro-magnetic lock taken along the lines 2—2 of Fig. 1;

Fig. 3 is a perspective view of the electro-magnetic lock showing the hexagonal form;

Fig. 4 is a perspective view of a portion of an electro-magnetic lock supporting member showing the cooperating hexagonal opening;

Fig. 5 is a view showing the rigid mounting of the electro-magnetic lock to a supporting plate;

Fig. 6 is a view showing a spring-type mounting for the electro-magnetic lock;

Fig. 10 is a perspective view of the X-ray apparatus showing in dotted lines both the longitudinal and crosswise tracks for the fluoroscope supporting column;

Fig. 11 is a partial section of the crosswise track taken along the lines 11—11 in Fig. 10;

Fig. 12 is a view of the crosswise track taken along the lines 12—12 in Fig. 11;

Fig. 13 is another view of the crosswise track taken along the line 13—13 in Fig. 11;

Fig. 14 is a diagram of the electro-magnetic lock energizing circuit for individual control of the crosswise movement of the fluoroscope column relative to the table;

Fig. 15 is a side elevation of the X-ray apparatus showing the table in vertical position and showing in dotted lines the longitudinal track and associated counterweight arrangement for the fluoroscope supporting column;

Fig. 16 is a sectional view of the longitudinal track taken along the lines 16—16 in Fig. 15;

Fig. 17 illustrates electro-magnetic lock circuit diagram for combined control of the longitudinal and crosswise movement of the fluoroscope supporting column relative to the table and including a centering means;

Fig. 18 is another embodiment of the electro-magnetic lock circuit diagram including a push-button control for combined action;

Fig. 19 is still another embodiment of the electro-magnetic lock circuit diagram for combined control of the longitudinal and crosswise movements and including compression control of the fluoroscopic unit;

Fig. 20 is a top view of the fluoroscope unit including the screen and spot film support and showing in dotted lines the pivotal horizontal positioning of the fluoroscope unit;

Fig. 21 is a side elevation of the fluoroscope supporting column and fluoroscope unit showing in dotted lines the horizontal positioning lock for the unit;

Fig. 22 is a cut-away section taken along the lines 22—22 in Fig. 20;

Fig. 23 is an electro-magnetic lock energizing circuit for individual control of the fluoroscope unit horizontal lock;

Fig. 24 is an end elevation of the X-ray apparatus showing in dotted lines the vertical positioning of the fluoroscope unit and the associated electro-magnetic lock;

Fig. 25 is a top view of the fluoroscope unit showing the compression and vertical position electro-magnetic locks;

Fig. 26 is a partial sectional view taken along the lines 23—23 in Fig. 27;

Fig. 27 is another partial sectional view of the vertical magnetic lock taken along the lines 24—24 in Fig. 22;

Fig. 28 is a partial side elevation showing in dotted lines the vertical positioning electro-magnetic locks for the fluoroscope unit along the supporting column;

Fig. 29 is a rear view of the top of the supporting colmun showing in dotted lines the vertical positioning electro-magnetic locks and associated counterweight;

Fig. 30 is a partial section taken along the lines 30—30 in Fig. 29 and showing the electro-magnetic locks and carriage rollers in detail;

Fig. 31 is a side elevation of an auxiliary X-ray tube stand showing various electro-magnetic locks and a vertically movable X-ray tube carriage including a counterweight arrangement;

Fig. 32 is a view taken along the lines 32—32 in Fig. 31, showing the tube stand, rollers, track, and associated electro-magnetic locks;

Fig. 33 is a top view of the tube stand under carriage taken along the lines 33—33 in Fig. 32;

Fig. 34 is a rear view of the auxiliary X-ray tube carriage shown mounted on a cut-a-way portion of the tube stand and showing in dotted lines the carriage electromagnetic locks and associated rollers;

Fig. 35 is a front view of the carriage of Fig. 34 showing the dial for indicating the angular position of the auxiliary X-ray tube relative to the stand;

Fig. 36 is a side elevation of the X-ray apparatus showing the bucky radiograph assembly in relation to the X-ray tube stand and fluoroscopic unit;

Fig. 37 is a sectional view taken along the lines 37—37 in Fig. 36, showing the various positions of the film cassette tray relative to the bucky carriage and the associated electro-magnetic lock;

Fig. 38 is a top view of the table showing in dotted lines the various positions of the film cassette relative to table;

Fig. 39 is an enlarged sectional view of the bucky assembly electro magnetic lock; and Fig. 40 is an energizing circuit diagram for individually controlling the bucky assembly electromagnetic lock.

Figure 7:
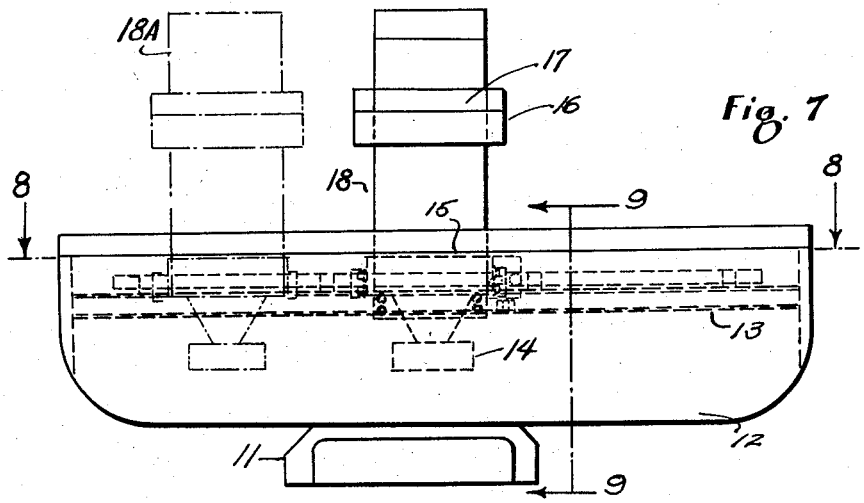
Fig. 7 is a side elevation of the X-ray apparatus showing in dotted lines the longitudinal track for the fluoroscopic supporting column and associated electro-magnetic locks.

The electro-magnetic lock of this invention is shown in detail in Figs. 1 to 6. The remaining figures of the drawings illustrate by way of example, various applications of such an electro-magnetic lock in a particular type of tiltable X-ray apparatus.

Referring to Fig. 1, a hexagonally shaped electromagnet 1 is mounted on a supporting member 6. The magnet 1 may be made of soft iron or other suitable low residual magnetic material and is hexagonally shaped on the exterior, as shown in Fig. 3, to prevent rotation of the magnet relative to the supporting member 6. The magnet 1 has an interior concentric slot for receiving an energizing coil 2. This construction results in a magnet having an inner central core 3 surrounded by a coil, both of which are enclosed by the outer leg or perimeter 4 of the magnet 1. A magnetically susceptible member 5 of iron, steel, or like material is positioned adjacent the core face of the magnet 3.

A source of electrical energy not shown, may be connected to the leads 7 to energize the coil and polarize the magnet. The path of the magnetic flux travels towards the core face through the central core 3 and back through the perimeter or outer leg 4 of the magnet. Accordingly, when the magnetically susceptible member 5 is positioned adjacent the core face of the magnet 1, the magnetic flux from the magnet traverses the adjacent regions of the member 5 making this member magnetically reverse in polarity to the adjacent pole faces of the magnet. The result is that the member 5 acts as an armature and is magnetically attracted to the magnet or vice versa, thus forming a closed magnetic path for the flux traveling from the central core outwardly through the member 5 and back through the perimeter 4 of the magnet.

In practice, the member 5 may be a stationary track and the magnet 1 may be carried on an adjacent movable member which is guided along the track so that when the magnet is energized, the attraction between the track and the magnet acts to arrest the movement of the movable member 6 relative to the stationary track 5.

In its preferred form, the electro-magnetic lock to be hereinafter more fully described in conection with a tiltable type X-ray apparatus, should be small enough and have sufficient power to provide positive magnetic locking action between the stationary and movable members of the apparatus. This type of action may be accomplished by constructing an electro magnetic lock having locking forces of between 16 and 30 pounds against sliding motion. In order to further enhance the arresting power of the magnet and to overcome the slight amount of friction developed by residual magnetism, a cover 35 of flexible material, such as neoprene is provided for the magnet which projects approximately $\frac{1}{64}$ of an inch beyond the face of the core. The neoprene face is preferably made in the form of a cylinder whose walls insulate the coil from the core and whose face is the braking or arresting surface of the magnet. Since the neoprene has a greater co-efficient of friction to steel than does steel to steel, the effort required to move a lock assembly is increased. Furthermore, the elasticity of the neoprene face results in a mushroom-type action which has a greater gripping power so that when the magnet is de-energized the neoprene, in returning to its original state, acts as a spring and lifts the magnet free of the track or armature, thereby eliminating any undesirable effects of residual magnetism in the magnet core.

In the embodiment shown in Figs. 1 to 4, the magnet 1 is provided with annular grooves 8 on its external diameter for keying the magnet 1 to the supporting member 6. The supporting member 6 may be punched or otherwise provided with a hexagon hole as shown in Fig. 4 and the magnet 1 is inserted with snap rings 9 in the annular grooves immediately adjacent the supporting member 6. The spaces between the annular grooves 8 are sufficiently large to allow the magnet 1 to float between the snap rings 9 and thereby be self-aligning. With this arrangement, the magnet 1 is attracted to the armature or track 5 when the coil is energized. However, it is apparent that other forms of construction may be utilized to carry out the same principle of operation. For example, the magnet 1 may be fixedly retained on the supporting member 6 and the armature or track arranged to be movable.

Other embodiments of the electro-magnetic lock structure as shown in Figs. 5 and 6. In Fig. 5, the magnet 1 is shown fixedly mounted on the supporting member 6, and in Fig. 6, the magnet 1 is shown loosely carried adjacent the supporting member 6 against the action of a spring or resilient member.

Figure 8:
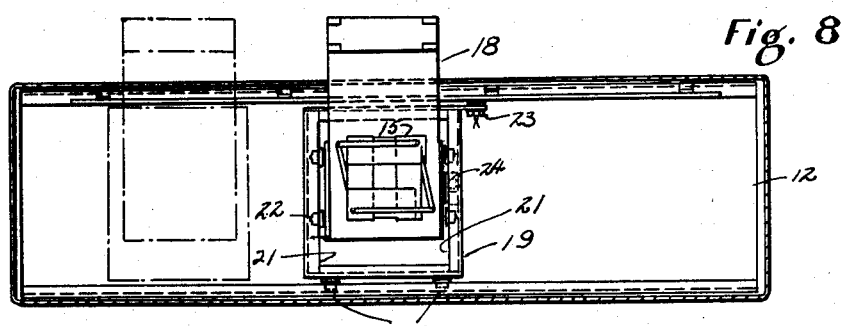
Fig. 8 is a top view of the X-ray apparatus taken along the lines 8—8 in Fig. 7.
Figure 9:
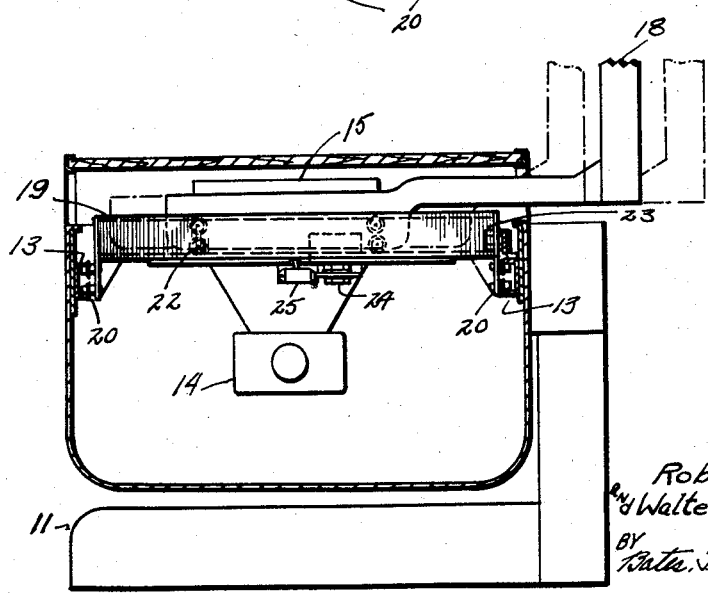
Fig. 9 is an end view of the X-ray apparatus taken along the lines 9—9 in Fig. 7.

The principle of the electro-magnetic lock is shown in the remaining drawings applied to a tilt-table type X-ray apparatus, carrying out the techniques of radiography the fluoroscopy. Referring to Figs. 6, 7 and 8 a frame 11 supports a table 12 for tiltable movement relative to the frame. The table 12 is provided with a longitudinal track as shown by the dotted lines 13. An X-ray tube head 14 including a shutter mechanism 15 and a fluoroscopic screen unit 16 having a spot-film device 17 are mounted on a supporting column 18 which is movably supported in a carriage 19 for longitudinal or crosswise positioning relative to the table 12.

The carriage 19 is mounted for movement longitudinal of the table 12 on anti-friction rollers 20 which are carried in the track 13. The carriage 19 is also provided with a track 21 which extends within the carriage frame in a direction cross-wise of the table 12. The supporting column 18 is also mounted on anti-friction rollers 22 for movement in the carriage track 21 crosswise on the table 12.

In their preferred form, each of the tracks 13 on the table and 21 in the carriage are provided with a magnetically susceptible member throughout their entire distance. The carriage 19 carries a magnet 23 of the type previously described which magnet may be remotely energized and controlled to lock against the track 13 and thereby arrest the longitudinal movement of the carriage relative to the table 12. The supporting column 18 is also provided with a magnet 24 adapted upon energization to coact in magnetic locking relation with the carriage track 21 to arrest crosswise movement of the supporting column 18 relative to the table 12.

The spot film device 17, which is carried within the fluoroscopic unit 16 above the table 12, is used by a radiologist to fluoroscope a patient on the table so that the moment the radiologist observes pathology of interest, he may quickly record it on film. For example, in the investigation of a stomach for ulcers, the patient is usually required to swallow barium meal which is radio opaque and as the barium descends into the stomach, the radiologist may palpitate the stomach in order to force the barium into the crater of the ulcer. The moment he visualizes this condition, he brings the film over very rapidly and makes a record. These films are usually small and as the barium descends into the stomach it is not possible to radiograph the entire tract on the spot film device. Furthermore, films taken with the spot film device are not of the quality that can be attained by means of a bucky radiograph and it may be necessary to transfer the center of pathology from the fluorescent screen to a radiographic tube on an auxiliary tube stand. In the case of fluoroscopy and spot-film operations, it is not necessary to place the patient in the exact center of the table. However, if a bucky radiograph is to be made, the patient must be centered on the table over the bucky diaphragm and associated film cassette. Accordingly, the carriage 19 is provided with electro-magnetic locks having at least two types of action as will be hereinafter more fully described.

Referring to Figs. 12 and 14, the crosswise electromagnetic lock 24 is shown connected through a mechanical centering switch 25 and a line switch 27 to a source of electrical energy. The centering switch 25 is spring operated and is mounted on the X-ray tube head 14 to co-operate with a notch 28 which is centrally located on the carriage 19 relative to the sides of the table 12 so that when the supporting column 18 and the associated tube head 14 are centrally positioned crosswise in the table 12, the spring operated switch arm 26 is free to move into the notch 28 and close the energizing circuit to the crosswise electromagnetic lock 24, thereby arresting further crosswise motion of the supporting column 18 relative to the table.

In accordance with the above described radiographic and fluoroscopic techniques, other forms of individual and combined action of the longitudinal and crosswise electro-magnetic locks may be desirable. For example, it may be desirable to have both the longitudinal and crosswise electro-magnetic locks operate simultaneously and instantaneously upon operating the control. On the other hand, the technique may require that neither of these locks be energized until the X-ray tube head and associated apparatus is centered on the table 12. Fig. 17 illustrates a control circuit which may be adapted for either of these types of operation, depending upon the positioning of a switch 29.

In this circuit, the longitudinal and crosswise electro-magnetic locks 23 and 24 are shown connected in parallel through a single pole, double-throw switch 29 to a source of electrical energy so that when the switch 29 is in the right-hand position, both of the electro-magnetic locks are simultaneously energized regardless of the relative positions of the controlled members. The other side of the switch 29 is connected through the centering switch 25 to the parallel connected electro-magnetic locks, so that when the switch 29 is thrown to the left-hand position, neither of the electro-magnetic locks are energized until the X-ray tube head is centrally positioned crosswise of the table 12. The technique of locking both electro-magnetic locks simultaneously regardless of the position of the controlled members would normally be used just before making an exposure with the spot film device, while the technique of withholding the locking of these locks until the tube head is centrally positioned crosswise of the table would be used when transferring to a radiographic exposure. In the latter case, with the carriage 19 locked in the exact center of the table, the patient may be moved on the table until the part of which a bucky radiograph is to be made is centered in the radiograph screen. An auxiliary tube stand 70, shown in Fig. 31, may then be brought into place and centered with the fluoroscopic unit by means of either a mechanical or optical centering device not forming part of this invention and therefore not shown. After the auxiliary tube stand is thus centered, the carriage 19 may be unlocked and moved out of the way as shown by the dotted lines 18A in Fig. 7.

One of the significant features of arresting the various motions of an X-ray apparatus by an electro-magnetic type lock is the variety of possible controls that may be accomplished with any given individual or combination of electro-magnetic locks. Thus, in addition to the several embodiments of control circuits shown in Figs. 14 and 17, it may be desirable in the apparatus shown to provide the type of control associated with the circuit shown in Fig. 18. The switch 30 may be in the form of a double pole, double throw switch with a neutral position or it may be a push button type switch having a like number of poles and positions. The control technique resulting from operation of the switch 30 in Fig. 18 is such that when the switch 30 is in the lower position and engaging the lower respective contact members 31 and 32, the longitudinal electro-magnetic lock 23 is immediately energized to arrest the longitudinal motion of the carriage 19 relative to the table 12, while the crosswise lock 24 is not energized until the X-ray tube head 14 is centrally positioned crosswise on the table 12, whereupon the centering switch 25 operates to close the energizing circuit to the crosswise electro-magnetic lock 24. When the switch 30 is in the upper position to engage the contact members 33 and 34, the centering switch 25 is excluded from the energizing circuit and both the longitudinal and crosswise electro-magnetic locks are immediately energized to simultaneously arrest both the longitudinal and crosswise movements of the supporting column 18 relative to the table 12.

As previously noted, the illustrated X-ray apparatus is a tilt-table type apparatus which may be tilted to intermediate angular or vertical positions relative to the supporting frame 11. When the table 12 is in the horizontal position shown in Fig. 7, the only forces of resistance to longitudinal motion of the supporting column 18 are the frictional forces between the rollers 20 and the track 13. However, when the table 12 is vertically positioned, as shown in Fig. 15, the weight of the supporting column 18 acts to aid downward motion and to restrain vertical motion of the column 19 along the longitudinal track. Accordingly, as shown in Fig. 15, in dotted lines a counterweight arrangement is provided to balance the vertical motion of the supporting column 19. The counterweight arrangement may be of any suitable form and may comprise a closed belt or cable 40 interconnecting the supporting column 18 with the weight 41. The cable 40 may be supported within the table 12 by means of pulleys 42.

Referring now to Figs. 20, 21, 22, and 23, the fluoroscopic unit 16 may be horizontally positioned about a pivot 45 on the supporting column 18 to a position directly over or adjacent the side of the table 12, or in any intermediate position as indicated by the dotted lines 16A in Fig. 20. The fluoroscopic unit 16 may be also provided with a magnetically susceptible armature 46 adjacent a magnet 47 on the supporting column 18, so that when the fluoroscopic unit 16 is positioned over the table in working relation, it may be magnetically locked and retained in that position by virtue of the electro-magnetic lock. A suitable energizing circuit for the electro-magnetic lock, including a push-button control 48, is shown in Fig. 23.

The fluoroscopic unit 16 may also be mounted on a pivot 49 for vertical pivotal movement with relation to the supporting column 18 as shown in Fig. 24. The dotted lines 16B represent the parked or non-working position of the fluoroscopic unit 16. Referring to Fig. 25, two magnetically susceptible armatures 51 and 52 are shown positioned on one side of the vertical pivot 49 in spaced relation on the fluoroscopic unit carriage 50 and extending over a pair of aligned magnets 53 and 54 on the fluoroscope unit respectively. Thus, when the fluoroscopic unit 16 is horizontally positioned over the table 12, the magnets 53 and 54 coact with the corresponding armatures 51 and 52 respectively to lock the fluoroscopic unit in this horizontal position. The force required to separate the horizontal magnetic locks is in the order of approximately 90 lbs. each, and two of such electromagnetic locks are sufficient to overcome the resistance of a patient lying on the table and pushing up against the fluoroscopic unit 16. Another magnet 55 is mounted on the fluoroscope unit 16 on the other side of the pivot 49 to cooperate with an armature 56 carried on the carriage 50 to lock the fluoroscope unit in the extended vertical position indicated by the dotted lines 16B in Fig. 24. A simple energizing circuit having push-button control with momentary contacts may be utilized to deenergize the electro-magnetic locks in either the horizontal or vertical positions.

In fluoroscopic spot film examinations, and particularly in the study of the stomach, the barium meal must be forced into position and held there during exposure. This is usually done by mounting a cone 43 in the form of a hemisphere in the path of the central X-ray beam and applying pressure to the patient while at the same time palpitating the stomach to be sure that the radio opaque media will flow as desired and then holding the desired position by means of a compression cone. Accordingly, the fluoroscope unit 16 must be pressed forward against the patient and locked with compression during exposure to the spot film. The electro-magnetic lock principle may likewise be adopted to accomplish this type of action in accordance with the arrangement shown in Figs. 28, 29, and 30, where the fluoroscopic carriage 50 is mounted for vertical movement along the supporting column 18 on anti-friction rollers 57. The carriage 50 is provided with one or more magnets 60 which are adapted to cooperate in magnetic locking relation with a vertical magnetically susceptible track 61 carried along the supporting column 18 throughout the desired distance of vertical movement of the carriage 50. The electro-magnetic locks 60 may be energized by means of the conveniently located switch 62, to arrest the movement of the cariage 50 and fluoroscopic unit 16 in either direction. In this way, compression may be applied to the patient and maintained during a spot film fluoroscopic examination.

Inasmuch as the carriage 50 and fluoroscopic unit 16 are adapted for vertical movement along the supporting column 18, a counter-weight arrangement which is similar to that described in relation to Fig. 15 is provided as shown in Figs. 28 and 29. The counter-weight 65 is connected to the carriage 50 through cables 66 which are looped over pulleys 67 on top of the supporting column 18 to counter-balance the carriage movement.

The electro-magnetic lock control circuits in Figs. 17 or 18 may easily be adapted to include control of the electromagnetic compression locks 60 of Fig. 30 as shown in the control circuit arrangement of Fig. 19. The control resulting from operation of this circuit is such that when the switch 30 is in the lower position, the longitudinal electro-magnetic lock 23 instantaneously arrests that movement of the supporting column 18 while neither the crosswise electro-magnetic lock 24 nor the compression locks 60 are energized until the supporting column is centrally positioned crosswise with respect to the table 12. With the switch in the upper position, all of the electro-magnetic locks are immediately energized regardless of the position of the controlled members.

As previously noted, an auxiliary X-ray tube stand may be utilized when employing the apparatus illustrated in the drawings for the technique of Radiography. One embodiment of such a tube stand is illustrated in Fig. 31 in the form of a vertical stand 70 positioned for movement along a track 71 which runs parallel to the table 12 and guided at the top by a trolley 72. In some instances, the tube stand 70 may be suspended from the trolley 72 without utilizing the track 71 at the base. An auxiliary X-ray tube carriage 73 is shown mounted for vertical movement on the tube stand 70 and is counter-balanced thereon by means of a counter-weight arrangement shown in dotted lines as embodying the counter-weight 74 with a cable 75 and pulley 76. An X-ray tube supporting arm 77 is mounted for rotation about a horizontal axis on the carriage 73 and carries an X-ray tube 78 which may be positioned along the supporting arm in accordance with the condition to be exposed.

The electro-magnetic lock principle is likewise adaptable to the various movements of the tube stand 70 and to the movements of each of the associated members relative to each other and the stand. Thus, as illustrated in Fig. 32, the tube stand 70 may be guided along the track 71 by means of a carriage 79 which is supported by rollers or wheels 80. One or both of the rollers 80 may be made of or provided with a magnetically susceptible material which will have magnetic locking attraction with a magnet 81 mounted on the carriage 79 adjacent the magnetically susceptible carriage roller 80.

The tube stand 70 is mounted for rotation about a vertical axis on the carriage 79, and the mounting to the carriage is made through an electro-magnetic lock arrangement as illustrated in Fig. 33. In the preferred embodiment shown, the carriage 79 has a flat circular journal plate 82 at the top adjacent the junction of the tube stand 70 with the carriage. A corresponding flange or flat journal plate 83 is carried at the base of the tube stand 70 adjacent to and in aligned relation with the disc 82 on the carriage. The tube stand flange 83 carries a magnet 84 which upon energization magnetically locks with the disc plate 82 acting as an armature on the carriage 79 in any position of the tube stand relative to the carriage. Rotation of the tube stand 70 is limited by the stop 93 on the upper journal plate 83. Suitable remote controls and energizing circuits may be provided for the electro-magnetic locks 81 and 84 to effect individual or combined action in order to arrest movement of the carriage 79 or the tube stand 70 as desired.

The carriage 73 on the tube stand 70 is also provided with an electro-magnetic lock 85, as shown in the dotted lines in Figs. 31 and 34, to arrest vertical movement of the carriage relative to the stand. The cooperating armature for the magnet 85 may, in its preferred form, embody a magnetically susceptible vertical track 86 carried along the tube stand 70 adjacent the magnetic lock 85. Suitable anti-friction rollers 87 are provided for the carriage 73 to aid vertical motion of the carriage along the stand 70.

The end of the X-ray supporting arm 77, which is adjacent the tube stand 70, carries a flat disc-type coupling and armature 88 which cooperates with the magnet 89 on the carriage 73. The disc armature 88 serves a dual purpose as an armature for the electro-magnetic lock 89 and as an indicating dial having markings 91 on the periphery which cooperate with a stationary pointer 90 on the carriage 73 to give a visual indication of the angular displacement of the X-ray tube 78 from the initial position represented by the pointer 90, as best shown in Fig. 35. An energizing circuit for the electro-magnetic locks, including remote control means, may be incorporated into the apparatus to operate the locks individually, or in combination, to arrest separate or combined movements of the individual members of the apparatus.

As previously noted, it is at times desirable and necessary to transfer the center of pathology to the radiographic tube 78 in order to effect a bucky radiograph of the particular pathology under observation. The combined operation of the fluoroscopic spot film and the bucky has been described in connection with Figs. 17 and 18, and the detailed construction of the bucky mechanism in the apparatus will hereinafter be more fully set forth in connection with Figs. 36 through 40.

Fig. 36 illustrates an assembly of the X-ray apparatus with the bucky carriage 100 and film cassette carrier 101 centrally positioned within the table 12 in operating relation with the auxiliary or radiographic tube stand. The dotted lines, 18B illustrate the manner in which the fluoroscope supporting column 18 may be displaced from the region of radiographic operation by merely sliding the carriage 19 along the longitudinal track 13 and energizing the corresponding electro-magnetic lock to arrest the supporting column in an out-of-the-way position relative to the work area during a radiographic operation. The bucky carriage 100 is mounted on anti-friction rollers 103 which are adapted to traverse the longitudinal track 13 of the table.

The carriage 100 supports the film cassette carrier or tray 101 which is loosely carried therein for movement crosswise of the table 12 as shown in Figs. 37 and 38 where the extended crosswise position of the film tray is shown in dotted lines as 101A. The bucky carriage 100 also supports a bucky screen or diaphragm 103 which is resiliently mounted at the top of the carriage so that either an artificial or normal vibration of the apparatus will vibrate the bucky screen to effect its function in a manner well known in the art. The bucky carriage 100 may be moved throughout the length of the table by towing the handle 104 extending from the film tray 101 and urging the entire carriage in either direction along the table 12 as desired.

As previously noted in connection with Figs. 17 and 18, the positioning and centering of the bucky apparatus is a precise operation and once the setting is made and the tube stand 70 is locked in place, it is desirable to lock the bucky carriage 100 in place to prevent inadvertent or unintentional mis-alignment which would require a readjustment of all the essential working members involved in the radiographic technique. Accordingly, the bucky carriage 100 is also provided with a magnet 105 which cooperates with the magnetically susceptible track 13 on the table 12. Although the energizing circuit for this electromagnetic lock may be remotely controlled after the manner of several other electro-magnetic locks in the apparatus, the preferred embodiment shown in Figs. 37 and 39 illustrates an automatic type control in the form of a spring operated switch 106 which is mounted on the bucky carriage 100 so that a spring arm 107 extends in a butting relation with one end of the film tray 101 when the tray is in the extreme enclosed position within the carriage 100. Once the bucky carriage is properly centered and positioned on the table relative to the radiographic tube 78 and a film cassette is inserted in the tray, the tray may be returned to its enclosed position within the carriage 100 so that the end which abuts the spring arm 107 of the switch 106 depresses the spring arm downward and closes the energizing circuit illustrated in Fig. 40, to lock the electro-magnetic lock 105 to the track 13 of the table, thereby arresting further movement of the carriage 100 relative to the table 12 and preventing inadvertent misalignment during the radiographic operation. By using this type of automatic control for the electro-magnetic lock 105, the bucky carriage is always locked when the film tray 101 is in the radiographic position, but the moment the tray is withdrawn enough to clear the switch arm 107, the bucky carriage is unlocked and can be moved relative to the table by urging or towing the handle 104.

The electro-magnetic lock and its application to an X-ray apparatus in accordance with this invention, as illustrated by way of example in the accompanying drawings and description, provides many distinct advantages over known types of X-ray apparatus by reason of providing conveniently located remote controls and eliminating the disadvantages inherent in the various adjustments and maintenance required for known types of mechanical locks. The fact that the electro magnetic type lock may be electrically controlled also provides an unlimited variety of individual and combined movements of a plurality of movable members relative to each other and to associated stationary members in any form of X-ray apparatus.

We have shown and described what we consider the preferred embodiment of our invention along with suggested modified forms, and it will be obvious to those skilled in the art that other changes and modifications, particularly with respect to the construction of the electro-magnetic lock and its aplication to various forms of X-ray apparatus, may be made without departing from the scope of our invention as defined by the appended claims.

We claim:

1. In an X-ray apparatus having a table and a fluoroscope supporting column associated therewith, a fluoroscopic unit carried by said column and mounted for pivotal horizontal movement relative to said column, a magnetically susceptible member carried by said supporting column adjacent said unit, a magnet and energizing coil mounted on said unit adjacent said magnetically susceptible member on said column, said magnet having pole portions disposed to define a magnetic path through said magnetically susceptible member, and electrical means for remotely energizing said coil, whereby said magnet is attracted to said magnetically susceptible member to retain said fluoroscope unit in working relation adjacent said supporting column.

2. In an X-ray apparatus having a table, an X-ray tube, and fluoroscope supporting column associated therewith, a fluoroscopic unit pivotally mounted for vertical positioning relative to said column, a plurality of magnetically susceptible members carried in spaced relation on said column adjacent said unit, a plurality of magnets and energizing coils mounted on said fluoroscopic unit adjacent each of said magnetically susceptible members respectively, each of said magnets having pole portions disposed to define a magnetic path through the corresponding magnetically susceptible member respectively, and electrical means for remotely energizing one of said coils, whereby the energized magnet is magnetically attracted to the corresponding magnetically susceptible member to retain said unit in a horizontal position, and other electrical means for remotely energizing another of said coils, whereby said other energized magnet is magnetically attracted to the corresponding magnetically susceptible member when the unit is in a vertical position relative to said column.

3. In an X-ray apparatus having a table and a fluoroscope supporting column associated therewith, a fluoroscopic unit carried by said column and mounted for pivotal horizontal and vertical movement relative to said column, a plurality of magnetically susceptible armatures carried by said column in spaced relation thereon, a corresponding number of magnets having energizing coils mounted on said unit in aligned relation with each of said corresponding armatures respectively, each of said magnets having pole portions disposed to define a magnetic path through the corresponding armature respectively, and electrical means for selectively remotely energizing each of said coils in predetermined relation, whereby each of the magnets is attracted to the corresponding armature to retain said fluoroscopic unit in horizontal working relation adjacent said column or in vertical parked relation to said column.

4. In an X-ray apparatus having a table and a fluoroscope supporting column associated therewith, a carriage carrying a fluoroscopic unit mounted for vertical movement along said column, a magnetically susceptible track on said column adjacent the carriage, a magnet having an energizing coil mounted on said carriage adjacent said track, said magnet having pole portions disposed to define a magnetic path through said track, and electrical means for remotely energizing said coil, whereby said magnet is attracted to said track to arrest vertical movement of said carriage along the column.

5. In an X-ray apparatus having a table and a fluoroscope supporting column associated therewith, a fluoroscope carriage mounted for vertical motion along said column, a magnetically susceptible track disposed along said column throughout the distance of movement of said carriage, a magnet having a coil mounted on said carriage adjacent said track, said magnet having pole portions disposed to define a magnetic path through said track, electrical means for remotely energizing said coil, whereby said magnet is attracted and adheres to said track to arrest further vertical motion of said carriage along said column, and means including a counterweight coacting with said carriage and supporting column to counterbalance the vertical motion of said carriage relative to the column.

6. In an X-ray apparatus having a table and a fluoroscope supporting column associated therewith, a carriage mounted for vertical movement along said column, a fluoroscopic unit carried by said carriage and mounted for pivotal horizontal and vertical movement relative to said column, a magnetically susceptible track carried by said column and a plurality of magnetically susceptible armatures mounted in spaced relation on said carriage, a magnet having an energizing coil on said carriage adjacent said track and a plurality of magnets having energizing coils mounted on said fluoroscopic unit and adapted for working aligned relation with the corresponding armatures on said carriage respectively, each of said magnets having pole portions disposed to define a magnetic path through the corresponding track and armatures respectively, and electrical means for remotely energizing each of said coils, whereby each of said magnets is attracted to a corresponding magnetically susceptible track or armature to arrest vertical movement of the carriage along the column and to retain said fluoroscopic unit in horizontal working relation adjacent said column or in vertical parked relation relative to said column.

7. An X-ray apparatus having a table, a fluoroscope supporting column mounted for longitudinal and crosswise motion relative to said table, a fluoroscope carriage mounted for vertical motion along said column, a plurality of electro-magnetic locks associated therewith and adapted to arrest the relative motion of said column and said carriage respectively, an electrical energizing circuit for said electro-magnetic locks, a plural position switch in said energizing circuit, said switch operating in one position to connect each of said electro-magnetic locks to the circuit simultaneously and thereby arrest relative motion of said column and carriage simultaneously, said switch operating in another position in the circuit to connect the corresponding electro-magnetic lock to the circuit to arrest longitudinal motion of said column, and means cooperating with said switch in the latter position to energize said other electro-magnetic locks consequent upon said column being centrally positioned in a crosswise direction relative to said table, thereby arresting crosswise motion of said column and vertical motion of said carriage.

8. An X-ray apparatus having a table, a fluoroscope supporting column mounted for longitudinal and crosswise motion relative to said table, a fluoroscope carriage mounted for vertical motion along said column, a fluoroscopic unit mounted for pivotal horizontal and vertical motion on said carriage, a plurality of electro-magnetic locks associated therewith and adapted to arrest the relative motions of said column, carriage, and fluoroscopic unit respectively, each of said electro-magnetic locks having a magnet and an armature disposed for magnetic coaction in response to a traversing magnetic field and electrical means for remotely energizing each of said electro-magnetic locks individually or in combination to arrest the relative motions of said column, carriage, and fluoroscopic unit in predetermined relation.

9. In an X-ray apparatus having a support and an X-ray tube stand mounted thereon for rotation about a vertical axis, an electro-magnetic lock including a magnet and an armature disposed for coaction between the stand and the support in response to a traversing magnetic field to arrest rotation of said tube stand relative to said support, and electrical means for remotely energizing said electro-magnetic lock.

10. In an X-ray apparatus having an X-ray tube stand, a carriage for said tube stand having a plurality of magnetically susceptible rollers, a magnet having an energizing coil positioned on said carriage adjacent one of said rollers, said magnet having pole portions disposed to define a magnetic path through said one of said rollers, and electrical means for remotely energizing said coil, whereby said magnet is attracted and adheres to said magnetically susceptible roller to arrest further motion of said carriage.

11. In an X-ray apparatus having an X-ray tube stand, a movable carriage therefor having a plurality of rollers, means mounting said tube stand for rotation about a vertical axis on said carriage, an electro-magnetic lock coacting between said carriage and tube stand and another electro-magnetic lock coacting between said carriage and rollers to arrest rotation of said tube stand relative to the carriage and to arrest motion of said carriage respectively, each of said electro-magnetic locks including a magnet and an armature disposed for magnetic coaction in response to a traversing magnetic field, and electrical means for remotely energizing each of said electro-magnetic locks individually or in combination in predetermined relation.

12. In an X-ray apparatus having an X-ray tube stand, a carriage mounted for vertical motion along said tube stand, an X-ray tube supporting arm mounted on said carriage for rotation about a horizontal axis, a plurality of electro-magnetic locks coacting therewith to arrest vertical motion of the carriage relative to the stand and to arrest rotation of said tube supporting arm relative to the carriage, each of said electro-magnetic locks including a magnet and an armature disposed for magnetic coaction in response to a traversing magnetic field, and electrical means for remotely energizing each of said electro-magnetic locks individually or in combination in predetermined relation.

13. In an X-ray apparatus having an X-ray tube stand and an X-ray tube supporting arm, means mounting said tube supporting arm on the stand for rotation about a horizontal axis relative to said tube stand, said means including a horizontal shaft on said stand having a magnetically susceptible flange coupled to a corresponding flange on said tube supporting arm, said coupled flanges having angular indications on one face thereof, and an indicator member mounted on said tube stand adapted to cooperate with said marked flange to indicate the angle of rotation of said tube supporting arm relative to said tube stand, a magnet having an energizing coil carried on said tube stand adjacent to said coupled flanges, and electrical means for energizing said coil, whereby said magnet is attracted and adheres to said coupled flanges to arrest further rotation of said tube supporting arm relative to said tube stand.

14. An X-ray apparatus comprising in combination, an X-ray tube stand, a movable carriage therefor having a plurality of magnetically susceptible rollers, means mounting said tube stand on said carriage for rotation about a vertical axis, an X-ray tube supporting arm, a carriage for said tube supporting arm mounted for vertical movement along said tube stand, means mounting said tube supporting arm for rotation about a horizontal axis relative to said carriage, a plurality of electro-magnetic locks coacting therewith to arrest motion of said tube stand carriage, tube supporting arm carriage, and rotation of said tube stand and tube supporting arm respectively, each of said electro-magnetic locks having a magnet and an armature disposed for magnetic coaction in response to a traversing magnetic field, and electrical means for remotely energizing each of said electro-magnetic locks individually or in combination in predetermined relation.

15. An X-ray apparatus comprising in combination, a table having a longitudinal magnetically susceptible track, a bucky carriage mounted for movement along said track, a film carrier movably carried within said bucky carriage for crosswise motion therein relative to said table, a magnet having an energizing coil mounted on said bucky carriage adjacent to said track, said magnet having pole portions disposed to define a magnetic path through said track, an electrical energizing circuit for said coil, a switch in said circuit carried within the bucky carriage and coacting with said film carrier in the extreme inward position to connect said coil in the energizing circuit and thereby cause said magnet to adhere to the track to arrest further longitudinal movement of said carriage relative to said table.

16. An X-ray apparatus comprising in combination, a frame having a table tiltably mounted relative thereto, a fluoroscope and an X-ray tube supporting column mounted for longitudinal and crosswise motion relative to said table, a fluoroscopic unit mounted for vertical motion along said column and for pivotal horizontal and vertical motion relative to said column, an auxiliary X-ray tube stand associated with said table and adapted to be longitudinally positioned relative thereto, means for rotating said auxiliary tube stand about a vertical axis, an auxiliary X-ray tube and tube supporting arm therefor, means mounting said auxiliary X-ray tube supporting arm for rotation about a horizontal axis relative to said auxiliary tube stand and for vertical motion along the said auxiliary tube stand, a bucky radiograph assembly mounted for longitudinal movement along said table, a film cassette carrier movably mounted in said bucky assembly for crosswise motion relative to said table, a plurality of electro-magnetic locks operatively associated with said apparatus and coacting therein to arrest the relative motions of the different elements of said apparatus respectively, each of said electro-magnetic locks having a magnet and an armature disposed for magnetic coaction in response to a traversing magnetic field, and electrical means for remotely energizing said electro-magnetic locks individually or in combination in predetermined relation.

17. An X-ray apparatus comprising in combination a frame having a table tiltably mounted relative thereto and having a plurality of members operatively positioned for movement relative thereto including an auxiliary X-ray tube stand positioned adjacent said table adapted to be longitudinally positioned relatively thereto, means for rotating said auxiliary stand about a vertical axis, an auxiliary X-ray tube and supporting arm therefor, means mounting said auxiliary X-ray tube and supporting arm for rotation about a horizontal axis and for vertical motion on said auxiliary tube stand, a bucky radiograph assembly mounted for longitudinal movement along said table, a film cassette carrier movably carried by said bucky assembly for crosswise motion relative to said table, a plurality of electro-magnetic locks, each lock operatively coacting in said apparatus to arrest a corresponding relative movement of one of the movable members respectively, each of said electro-magnetic locks having a magnet and an armature disposed for magnetic coaction in response to a traversing magnetic field, and electrical means for remotely energizing said electro-magnetic locks individually or in combination to automatically arrest each movement on predetermined relation to the X-ray operation performed.

18. In an X-ray apparatus having a stand for carrying an X-ray device, an X-ray device adapted to be independently positioned relative to said stand, a supporting arm for said device mounted on said stand for free rotation about a horizontal axis, an electro-magnetic lock coacting between the arm and the stand when energized to arrest rotation of said arm in selected rotated positions of the arm, said electro-magnetic lock having a magnet and an armature disposed for magnetic coaction in response to a traversing magnetic field, and electrical means for remotely energizing said electro-magnetic lock.

19. In an X-ray apparatus having a stand for an X-ray device, an X-ray device adapted to be independently positioned relative to the stand, an arm for supporting said device coupled to the stand for free rotation about a horizontal axis, said coupling including a horizontal shaft on the stand having a magnetically susceptible transverse flange coupled to a corresponding flange on the arm, a magnet having an energizing coil carried on the tube stand adjacent the coupled flanges, said magnet when energized adapted to be attracted for adherence to said coupled flanges to arrest further rotation of the supporting arm relative to the stand, and electrical means for energizing the magnet coil.

References Cited in the file of this patent

UNITED STATES PATENTS

| | | |
|---|---|---|
| 2,208,258 | Grobe | July 16, 1940 |
| 2,567,566 | Kizaur | Sept. 11, 1951 |
| 2,673,627 | Stava et al. | Mar. 30, 1954 |
| 2,823,315 | Stava et al. | Feb. 11, 1958 |